United States Patent
Zhou et al.

(10) Patent No.: US 12,147,240 B2
(45) Date of Patent: Nov. 19, 2024

(54) METHOD FOR EXPANDING WORKING AREA BASED ON LASER MAP, CHIP AND ROBOT

(71) Applicant: AMICRO SEMICONDUCTOR CO.,LTD., Guangdong (CN)

(72) Inventors: Hewen Zhou, Guangdong (CN); Huibao Huang, Guangdong (CN); Chi Wang, Guangdong (CN); Zhuobiao Chen, Guangdong (CN)

(73) Assignee: AMICRO SEMICONDUCTOR CO., LTD., Guangdong (CN)

( * ) Notice: Subject to any disclaimer, the term of this patent is extended or adjusted under 35 U.S.C. 154(b) by 121 days.

(21) Appl. No.: 17/626,816

(22) PCT Filed: Nov. 24, 2020

(86) PCT No.: PCT/CN2020/131196
§ 371 (c)(1),
(2) Date: Jan. 13, 2022

(87) PCT Pub. No.: WO2021/243978
PCT Pub. Date: Dec. 9, 2021

(65) Prior Publication Data
US 2023/0073479 A1  Mar. 9, 2023

(30) Foreign Application Priority Data

May 30, 2020 (CN) .......................... 202010480433.7

(51) Int. Cl.
*G05D 1/00* (2024.01)
*G01C 21/20* (2006.01)
*A47L 11/40* (2006.01)

(52) U.S. Cl.
CPC .......... *G05D 1/024* (2013.01); *G01C 21/206* (2013.01); *G05D 1/0274* (2013.01);
(Continued)

(58) Field of Classification Search
CPC .... G05D 1/024; G05D 1/0274; G05D 1/0231; G01C 21/206; A47L 11/4002;
(Continued)

(56) References Cited

U.S. PATENT DOCUMENTS

| | | | |
|---|---|---|---|
| 2011/0211731 A1* | 9/2011 | Lee .................. | G06V 20/52 382/173 |
| 2017/0193830 A1* | 7/2017 | Fragoso ............. | G06V 10/751 |
| 2019/0385363 A1 | 12/2019 | Porter et al. | |

FOREIGN PATENT DOCUMENTS

| | | |
|---|---|---|
| CN | 104813343 A | 7/2015 |
| CN | 106239517 A | 12/2016 |

(Continued)

*Primary Examiner* — Harry Y Oh
*Assistant Examiner* — Dylan M Katz
(74) *Attorney, Agent, or Firm* — Samson G. Yu

(57) ABSTRACT

The present disclosure provides a method for expanding a working area based on a laser map, a chip and a robot, and the method for expanding the working area includes using map pixel point information obtained by laser scanning to position pending boundary lines, deciding a next expansion of a rectangular working area according to an increment of a diagonal length of the rectangular working area framed by the pending boundary lines in a current expansion process, stopping expanding the rectangular working area of the robot when the increment of the diagonal length before expanding and after expanding reaches an overlap condition.

7 Claims, 5 Drawing Sheets

(52) U.S. Cl.
CPC ........ *A47L 11/4002* (2013.01); *A47L 11/4011* (2013.01); *A47L 11/4061* (2013.01); *A47L 2201/04* (2013.01)

(58) Field of Classification Search
CPC .............. A47L 11/4011; A47L 11/4061; A47L 2201/04; A47L 9/2826; A47L 9/2889; A47L 9/30; A47L 9/2852; A47L 11/24; A47L 11/40; A47L 2201/00
See application file for complete search history.

(56) References Cited

FOREIGN PATENT DOCUMENTS

| | | |
|---|---|---|
| CN | 107328419 A | 11/2017 |
| CN | 107378953 A | 11/2017 |
| CN | 107898393 A | 4/2018 |
| CN | 107997690 A | 5/2018 |
| CN | 108981710 A | 12/2018 |
| CN | 109464074 A | 3/2019 |
| CN | 110412619 A | 11/2019 |
| CN | 110731734 A | 1/2020 |
| CN | 110888960 A | 3/2020 |
| CN | 111168678 A | 5/2020 |
| CN | 111631642 A | 9/2020 |
| DE | 102014226084 A1 | 6/2016 |
| WO | 03040845 A1 | 5/2003 |
| WO | 2019053062 A1 | 3/2019 |
| WO | 2020041817 A1 | 3/2020 |

\* cited by examiner

METHOD FOR EXPANDING WORKING AREA BASED ON LASER MAP, CHIP AND ROBOT

CROSS-REFERENCE TO RELATED APPLICATION

The present disclosure claims the priority of Chinese Patent Application No. 202010480433.7, filed to the China National Intellectual Property Administration on May 30, 2020 and entitled "Method for Expanding Working Area Based on Laser Map, Chip and Robot", which is incorporated herein its entirety by reference.

TECHNICAL FIELD

The present disclosure relates to the technical field of robot laser immediate positioning and concurrent mapping, in particular to a method for expanding a working area based on a laser map, a chip and a robot.

BACKGROUND

A robot can detect an indoor floor contour boundary (the environmental contour of the enclosed area enclosed by walls) during the process of autonomous navigation movement on the indoor floor, draw an indoor map based on a detection result and store the indoor map for subsequent cleaning the indoor floor based on the indoor map which is stored. In related technologies, a mobile robot can detect a position of obstacles (wall or non-wall obstacles), use the position of the obstacles as a position of the wall, and use a closed area surrounding by at least one wall as an indoor working area, but it is difficult to expand the indoor working area of reasonable size, which can easily cause a large free map area to be divided into multiple small areas and reduce the efficiency of the robot in the indoor working area, and is not conducive to controlling the robot to walk along the edge to search for the target position along the framed contour boundary.

SUMMARY

The present disclosure discloses the following specific technical solutions:

A method for expanding a working area based on a laser map, the method for expanding the working area includes: step 1, pending boundary lines are set along coordinate axis directions of the laser map constructed in real time, so that an area extending along each of the coordinate axis directions is divided by the pending boundary line set correspondingly; step 2, when a robot moves to a preset position of an indoor working area, ne pending boundary line closest to the preset position in each of the coordinate axis directions is selected, and an initial working area which is rectangular is framed; step 3, one coordinate axis direction of priority expansion is selected according to a preset expansion priority condition, one pending boundary line set perpendicular to the coordinate axis direction correspondingly in the initial working area is deleted, then the initial working area along the coordinate axis direction which is same is started to expand, so that an initial working area after expanding is a new rectangular working area formed by a remaining pending boundary line framing the initial working area and one pending boundary line closest to the pending boundary line which is deleted; and step 4, whether an increment of a diagonal length of the initial working area after expanding and a diagonal length of the initial working area before expanding is less than a preset overlap size error value is judged, in a case that the increment of the diagonal length of the initial working area after expanding and the diagonal length of the initial working area before expanding is less than the preset overlap size error value, expanding is stopped.

Optionally, the method further includes expanding in the coordinate axis direction currently selected in the step 3 is stopped when the increment of the diagonal length of the initial working area after expanding and the diagonal length of the initial working area before expanding is less than the preset overlap size error value, and returning to the step 3 to select one coordinate axis direction with a lower expansion priority.

Optionally, the method further includes one pending boundary line in the initial working area after expanding perpendicular to the pending boundary line selected in the step 3 is deleted when judging that the increment of the diagonal length of the initial working area after expanding and the diagonal length of the initial working area before expanding is greater than or equal to the preset overlap size error value, and then the initial working area after expanding along the coordinate axis direction which is same is continuously expanded, so that the initial working area is re-expanded from a location of the pending boundary line which is currently deleted to one pending boundary line closest to the pending boundary line which is currently deleted, and then returning to the step 4.

Optionally, a method for positioning and marking the pending boundary line includes: whenever the number of black pixel points with a same ordinate value counted along an X-axis direction exceeds a preset boundary threshold value, the pending boundary line formed by a connection of the black pixel points with the same ordinate value is marked, so that an area extending along the X-axis direction is divided by the pending boundary line correspondingly; and whenever the number of the black pixel points with a same abscissa value counted along a Y-axis direction exceeds a preset boundary threshold value, the pending boundary line formed by a connection of the black pixel points with the same abscissa value is marked, so that an area extending along the Y-axis direction is divided by the pending boundary line correspondingly.

Optionally, the diagonal length of the initial working area after expanding and the diagonal length of the initial working area before expanding are both obtained by computing a square sum of a length of a line segment corresponding to one pending boundary line set perpendicular to the X-axis direction and a length of a line segment corresponding to one pending boundary line set perpendicular to the Y-axis direction of the rectangular working area which is framed according to Pythagorean theorem.

Optionally, the coordinate axis direction of priority expansion is selected according to the preset expansion priority condition, includes: the number of white pixel points arranged on a line segment corresponding to each of the pending boundary lines of the initial working area which is framed is compared, and the larger the number of the white pixel points is, the higher the expansion priority condition configured for the pending boundary line is, and one coordinate axis direction that is perpendicularly matched with the pending boundary line is preferentially selected as the coordinate axis direction of priority extension.

Optionally, when each of the pending boundary lines of the initial working area which is framed is not a non-wall boundary line segment, and a length of an isolated obstacle line segment in the initial working area is less than a relatively small value, determining that the initial working area is a closed area, the relatively small value is the smaller of a preset ratio of a line segment length corresponding to the number of pixel points of a third predetermined number and a length of any side of the initial working area; and when one of the pending boundary lines of the initial working area which is framed is the non-wall boundary line segment, or the length of the isolated obstacle line segment in the initial working area is greater than or equal to the line segment length corresponding to the number of the pixel points of the third predetermined number, or the length of the isolated obstacle line segment in the initial working area is greater than or equal to a preset ratio of a length of one side of the initial working area, the initial working area is not the closed area is determined, and the pending boundary lines are divided into non-wall boundary line segments and wall boundary line segments according to the number of the white pixel points, the number of the white pixel points in the non-wall boundary line segment is greater than or equal to a certain threshold value, while the wall boundary line segment is less than the certain threshold value, and the threshold value is greater than the preset boundary threshold value; and and isolated obstacle line segments which are scanned also exist in the laser map, when the length of the isolated obstacle line segment is greater than or equal to one of the preset ratio of the length of one side of the initial working area and the length of the line segment corresponding to the number of the pixel points of the third predetermined number, the isolated obstacle line segment is determined as a wall in the initial working area, and thus is marked as the wall boundary line segment to cooperate with other of the pending boundary lines to frame a new rectangular working area.

A chip with a control program inside, and the control program is configured to control a mobile robot to execute the method for expanding the working area.

A robot equipped with a laser sensor, and the robot is provided with the chip for processing laser data scanned by the laser sensor in real time to construct a laser map.

DETAILED DESCRIPTION OF THE EMBODIMENTS

Figure 1:
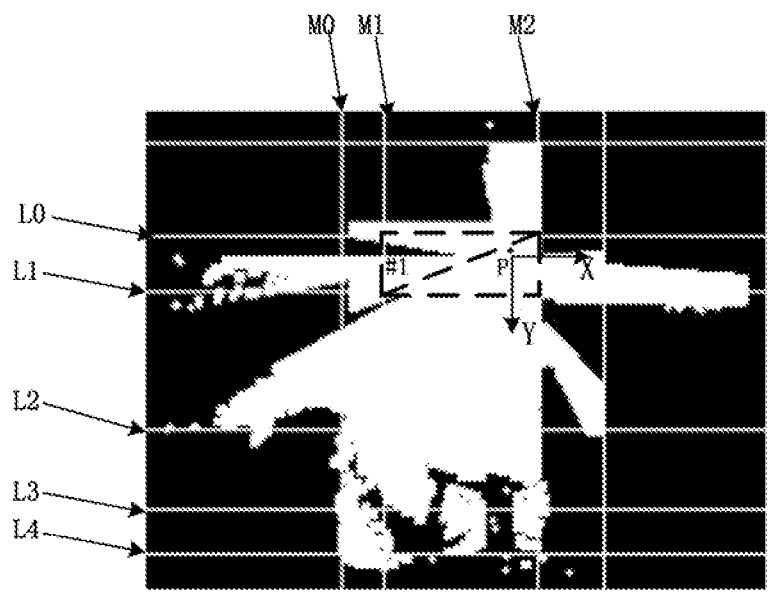
FIG. 1 is an effect diagram of framing an initial working area #1 on a laser map disclosed by embodiments of the present disclosure.

The technical solution in the embodiment of the present disclosure will be described in detail with reference to the drawings in the embodiments of the disclosure. To further illustrate the embodiments, the present disclosure is provided with drawings. The drawings, which are a part of the disclosure of the present disclosure, are mainly used to illustrate embodiments, and can be taken in conjunction with the relative contents in the description, to explain the operation principle of the embodiments. Other possible embodiments, as well as the advantages of the present disclosure, will be understood by those skilled in the art with reference to these contents. An image size of a laser map in the drawings is not drawn to scale. The executive subject of the method program of the embodiments of the present disclosure is a laser navigation robot. This laser navigation robot can be equipped with laser sensors. The laser sensors can detect obstacles. In general scenes, when the laser navigation robot moves indoors, it can detect whether there are obstacles around it through the laser sensors disposed on the laser navigation robot. When a wall obstacle is detected, the robot executes edge behavior to navigate to a target position along the wall obstacle.

Figure 6:
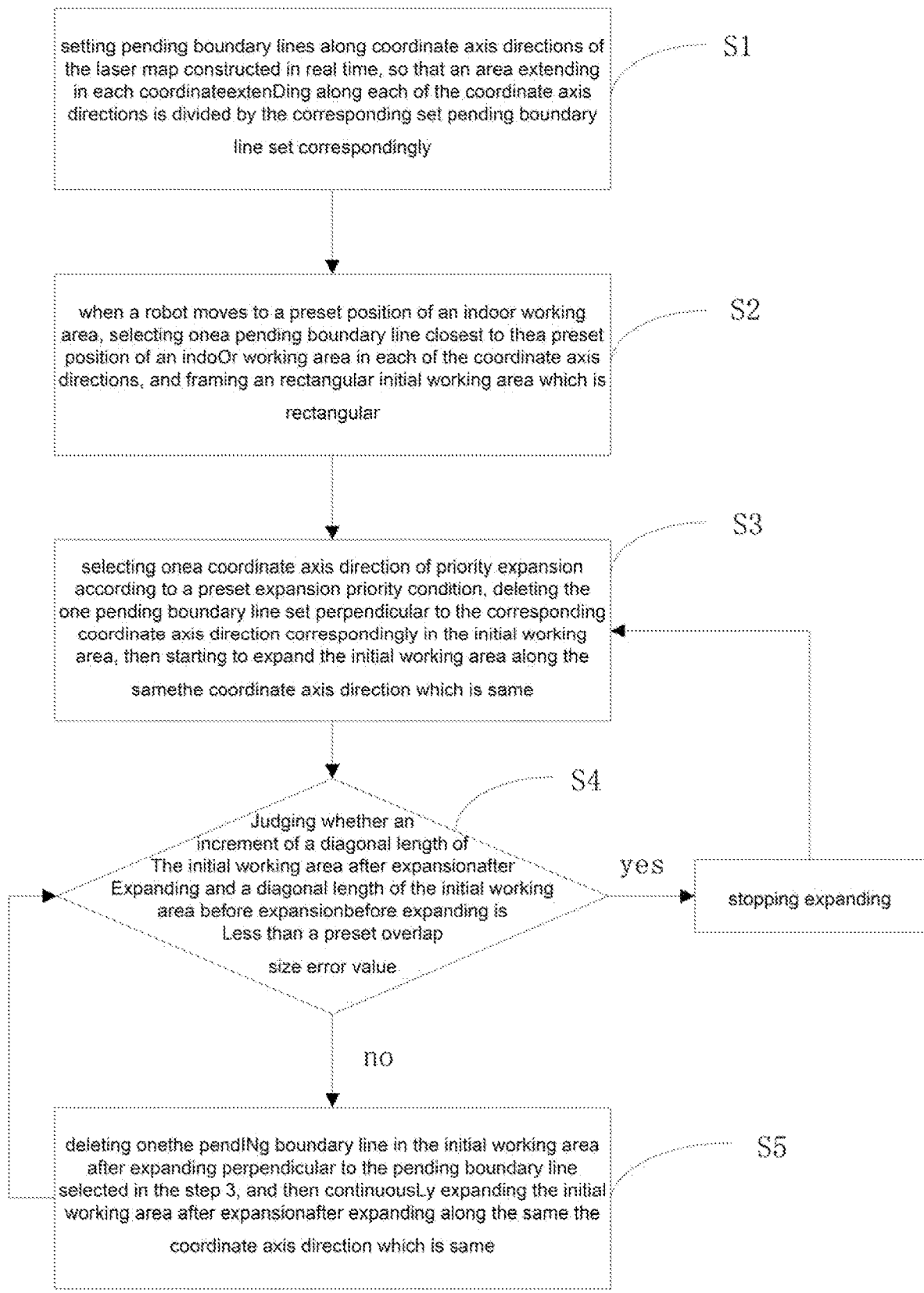
FIG. 6 is a flowchart of a method for expanding a working area based on a laser map disclosed by embodiments of the present disclosure.

The embodiments of the present disclosure disclose a method for expanding a working area based on a laser map, as shown in FIG. 6, the method for expanding the working area includes:

step S1, pending boundary lines are set perpendicular to each of coordinate axis directions in the laser map constructed in real time, so that a isolated extension area on each of the coordinate axis directions of a local environment where a preset position is located is divided by the pending boundary line set correspondingly; then proceeding to step S2. Each of the coordinate axis directions can be regarded as a detection direction of a laser navigation robot at the preset position, by processing statistical information of image pixel points of a laser map constructed in real time in each of the detection direction, the pending boundary lines are located, a contour position of a target object or its room area is searched for at the same time, the pending boundary lines intersect to form working areas adjacent on the laser map, completing a regional map image segmentation in each of the coordinate axis directions, as shown in FIG. 1, white boundary lines distributed vertically and horizontally correspond to white lines arranged horizontally and vertically on the laser map, they intersect to form rectangular areas on the laser map, that is, the pending boundary lines, are used to run through the working area with a large span in each of the coordinate axis directions in a passable area (such as a local area with a long gallery in FIG. 1), and form a cut on wall areas and non-wall areas, so that an area extending along each of the coordinate axis directions (white branch-like area in FIG. 1) is divided by the pending boundary line set correspondingly. It is worth noting that the coordinate axis directions as mentioned above do not change as a current moving direction of the robot changes, and the coordinate axis directions as mentioned above are only related to the preset position of the robot at present.

In the step S1, on an image of the laser map constructed by the robot in real time, as shown in FIG. 1, a histogram statistic of obstacles is performed, starting from a preset position p, along 4 coordinate axes directions at a distance interval of a first predetermined number of pixel points, to obtain relative position information of the pixel points in the corresponding direction and the preset position p, and then the pending boundary lines and isolated obstacle line segments in each of the coordinate axis directions on the image of the laser map are marked and positioned; and the isolated obstacle line segments are small sets of white pixel points and short obstacle line segments scattered and distributed in FIG. 1, it should be noted that, a method for performing the histogram statistic of the obstacles includes: dividing detection intervals sequentially along the 4 coordinate axis directions starting from the preset position p at the distance interval of the first predetermined number of the pixel points within a scanning range of the robot's laser sensor, and a size of the detection interval in each of the coordinate axis directions is a line segment length distance corresponding to the first predetermined number of the pixel points; and counting the number of pixel points of gray scale in each of the detection intervals, and the detection intervals are adjacent. Specifically, the pixel points on a X-axis positive direction, a X-axis negative direction, a Y-axis positive direction and a Y-axis negative direction of the laser map are counted respectively starting from the preset position P, and the histogram statistic of the obstacles is performed in each of the coordinate axis directions according to a distance interval (as an equivalent length distance of 75 cm) consisting of 15 pixel points, where each of the pixel points corresponds to an equivalent length distance of 5 cm, the first predetermined number is preferably 15, and the distance interval corresponding to the first predetermined number of the pixel points is 75 cm. In this embodiment, the histogram statistic of the obstacle is used to count the number of the pixel points of gray scale appearing in the detection intervals with different distances from the preset position P, and it also achieves positioning of the obstacle line segments formed by the pixel points of gray scale correspondingly on the laser map. The gray scale represents a grayscale value of the pixel point, the grayscale value refers to a color value of each grayscale object when the grayscale object of the laser map binarized is converted into RGB, and the white pixel point and the black pixel point are divided into several levels according to a logarithmic relationship, which are called "grayscale levels", generally ranging from 0 to 255, totaling 256 grayscale levels. A grayscale value of the white pixel point is 255, and a grayscale value of the black pixel point is 0, so a black and white picture is also called a gray image.

Figure 7:
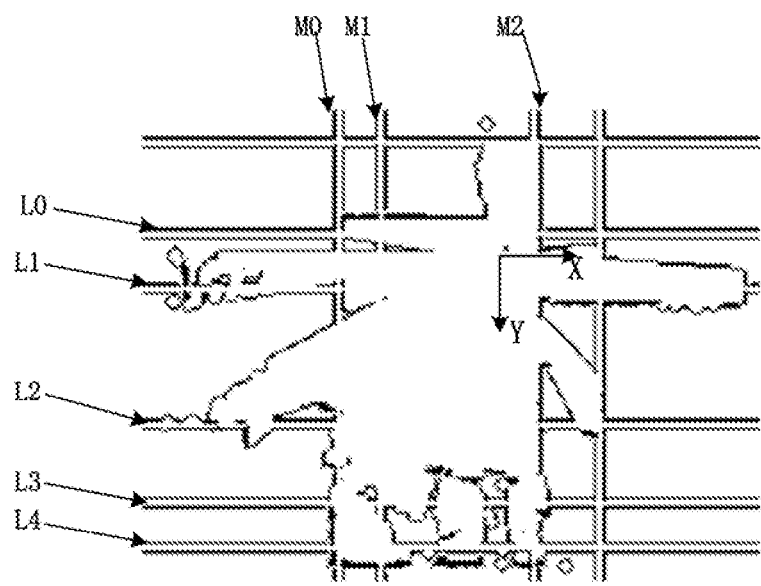
FIG. 7 is a black-and-white map schematic diagram of a room area contour composed of black pixel points framed by pending boundary lines disclosed in the embodiments of the present disclosure.

As shown in FIG. 7, the contour boundary of the room area is composed of black pixel points, the working area in the room is an idle area filled with the white pixel points, an other map area is composed of pixel points with other grayscale values. In the embodiments of FIGS. 1 to 5, the other map area except a middle white area and discrete white areas is composed of the pixel points of the other grayscale values, and although the illustration is black, the other map area is actually composed of the pixel points of the grayscale values from 1 to 254, and only the contour boundary of the room is black pixel points. A method for positioning and marking the pending boundary line includes: whenever the number of the black pixel points with a same ordinate value counted along an X-axis direction exceeds a preset boundary threshold value, marking the pending boundary line formed by a connection of the black pixel points with the same ordinate value, so that an area extending along the X-axis direction is divided by the pending boundary line correspondingly, and in fact, the subsequent steps can judge that the pending boundary line is not a wall and delete it, and then merge the region correspondingly divided to avoid over-dividing the region, but contour features of the local area in the X-axis direction can still be described; and not marking the pending boundary line along a current direction whenever the number of the black pixel points with the same ordinate counted along the X-axis direction does not exceed the preset boundary threshold value. Whenever the number of the black pixel points with a same abscissa value counted along a Y-axis direction exceeds a preset boundary threshold value, marking the pending boundary line formed by a connection of the black pixel points with the same abscissa value, so that an area extending along the Y-axis direction is divided by the pending boundary line correspondingly, otherwise, not marking the pending boundary line along the current direction. Therefore, contour features of the local area in the Y-axis direction can be described. Subsequent steps can judge that the pending boundary line determined in this direction is not a wall and cannot play the role of dividing the area. It is necessary to continue searching for a next pending boundary line and frame the room area with a reasonable size. It should be noted that the preset boundary threshold value is related to a size of a robot body and a length and width of the passable area of the room, and the preset boundary threshold value can be adjusted according to actual needs. In this embodiment, the preset boundary threshold value is set to 5 m, which corresponds to 500 pixel points with the same ordinate value or 500 pixel points with the same abscissa value, where the equivalent length distance corresponds to each pixel point is 5 cm.

As shown in FIG. 1, a extension area of the local environment where the preset position P is located in each coordinate axis direction (the white protruding area with radial distribution in FIG. 1) is divided by the pending boundary lines set perpendicular to the coordinate axis direction correspondingly, and the more isolated extension areas distributed in the same coordinate axis direction, the easier it is to be divided by the pending boundary lines perpendicular to the coordinate axis direction. The larger a coverage of the passable area (a continuous area composed of white pixel points in FIG. 1) in the same coordinate axis direction, the easier it is to be divided by the pending boundary lines distributed parallel to the coordinate axis direction. The pending boundary lines include a pending boundary line M2, a pending boundary line M1 and a pending boundary line M0 positioned and marked parallel to the Y-axis direction, and pending boundary lines L0, L1, L2, L3 and L4 continuously positioned and marked parallel to the X-axis direction in FIGS. 1 and 7. In this embodiment, an area with a certain degree of passability in the room area is selected to mark the pending boundary lines according to the number of continuously distributed black pixel points and/or discretely distributed black pixel points in the same coordinate axis direction. The pending boundary lines surrounding the initial working area can be aligned with each other to make the area division more regular and reasonable, and also ensure that the pending boundary lines which are marked can frame rectangular working areas for the robot to walk along the edge.

Figure 2:
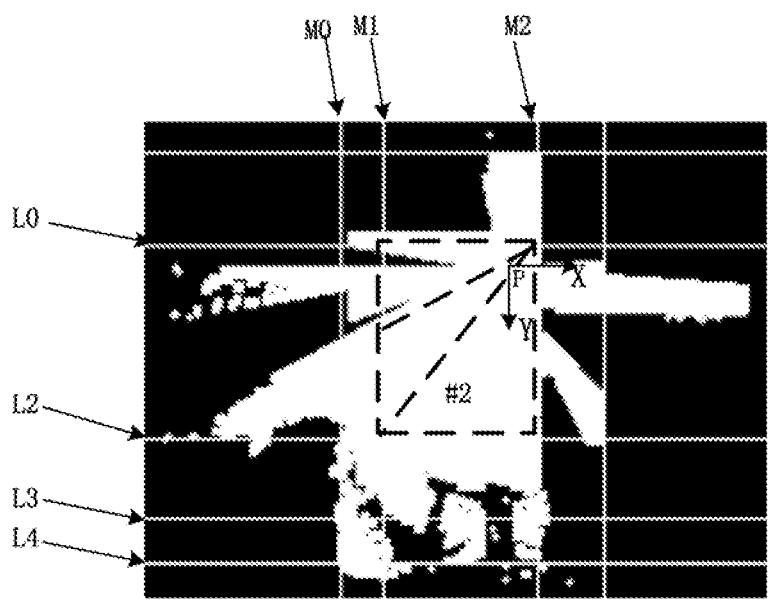
FIG. 2 is an effect diagram of deleting a pending boundary line L1 and framing a rectangular working area #2 on the laser map of FIG. 1.

Step S2, when the robot moves to a preset position in the room area, one pending boundary line closest to the preset position in each of the coordinate axis directions is selected, an initial working area which is rectangular and surrounds the preset position is framed, a dotted rectangular frame #1 surrounding the preset position P is formed in the laser map of FIG. 1, a diagonal length of the initial working area which is rectangular is calculated, and then proceeding to step S3. In the step S2, the working area which is rectangular and surrounds the preset position P is framed by selecting the pending boundary lines closest to the preset position P in the X-axis positive direction, the X-axis negative direction, the Y-axis positive direction and the Y-axis negative direction of the global coordinate system respectively, as shown in FIG. 2, the initial working area which is rectangular #1 is framed by the pending boundary line M1 closest to the left of the preset position P, the pending boundary line M2 closest to the right of the preset position P, the pending boundary line L0 closest the top the preset position P, and the pending boundary line L1 closest to the bottom the preset position P. In the step, the initial working area for expansion is provided according to the relative positional relationship between the preset position and its closest pending boundary lines.

step S3, one coordinate axis direction of priority expansion is selected according to a preset expansion priority condition, then one pending boundary line set perpendicular to the coordinate axis direction of priority expansion correspondingly in the initial working area is deleted, then the initial working area along the coordinate axis direction of priority expansion which is same is started to expand, so that an initial working area after expanding is a new rectangular working area formed by a remaining pending boundary line framing the initial working area and one pending boundary line closest to the pending boundary line which is deleted, and then proceeding to step S4. The initial working area formed by expanding in the step S3 covers the initial working area framed in the step S2. The diagonal length of the initial working area calculated in the step S2 is maintained before the pending boundary line perpendicular to the coordinate axis direction of priority expansion correspondingly in the initial working area is deleted; and a diagonal length of the initial working area after expanding is calculated after the new rectangular working area is expanded. Preferably, the diagonal length of the initial working area after expanding and the diagonal length of the initial working area before expanding are both obtained by computing a square sum of a length of a line segment corresponding to one pending boundary line set perpendicular to the X-axis direction and a length of a line segment corresponding to one pending boundary line set perpendicular to the Y-axis direction of the rectangular working area which is framed according to Pythagorean theorem, i.e., by first computing a square sum of the length and width surrounding the rectangular working area, and then obtaining the diagonal length of the rectangular working area by computing a square root of the square sum. The embodiment utilizes the diagonal length of the rectangular working area to express the size of the working area framed by the pending boundary lines, which is used for judging overlap degree of the rectangular working area before expanding and after expanding in subsequent steps.

Preferably, the coordinate axis direction of priority expansion selected in the step S3 can be the X-axis direction or the Y-axis direction, and an expansion priority in the Y-axis direction can be set higher than an expansion priority in the X-axis direction. The method for selecting the coordinate axis direction of priority expansion according to the preset expansion priority condition includes: the number of white pixel points arranged on a line segment corresponding to each of the pending boundary lines of the initial working area which is framed is compared, the larger the number of the white pixel points is, the higher the expansion priority configured for the pending boundary line is, and one coordinate axis direction that is perpendicularly matched with the pending boundary line is preferentially selected as the coordinate axis direction of priority extension. According to the embodiment, the initial working area is expanded into a closed area with a larger passable area, and the navigation efficiency of the robot along the area boundary is improved.

Step 4, whether an increment of a diagonal length of the initial working area after expanding and a diagonal length of the initial working area before expanding is less than a preset overlap size error value is judged, in a case that the increment of the diagonal length of the initial working area after expanding and the diagonal length of the initial working area before expanding is less than the preset overlap size error value, expanding in the coordinate axis direction currently selected in the step S3 is stopped, and returning to the step S3 to select one coordinate axis direction with a lower expansion priority to continue expanding the area, otherwise, proceeding to step S5. A preset overlap size error value is set to a length test experience value between 0.2 cm and 1.6 cm, when a length increment of the two diagonals involved in the comparison in the step S4 is less than the preset overlap size error value, it can be regarded as overlap, which is used to reflect a density of distribution of pending boundary lines perpendicular to the coordinate axis direction of first expansion, and the smaller the length increment of diagonal lines, the denser the distribution of the corresponding pending boundary lines, which reflects the degree to which the pending boundary line approaches the wall boundary connecting a plurality of discretely distributed room corner areas.

Step S5, one pending boundary line which is perpendicularly set in the coordinate axis direction of the priority expansion selected and determined in the step S3 of the initial working area after expanding is deleted, then the initial working area which is expanded along the same coordinate axis direction is continued to expand, so that the pending boundary line perpendicularly set in the same coordinate axis direction of the re-expanded initial working area is expanded from the pending boundary line which is currently deleted to the pending boundary line closest to the pending boundary line which is currently deleted, and then returning to the step S4. The deleted pending boundary line at this time is not a wall boundary, and can not cooperate with other pending boundary lines to frame a working area with a reasonable size, and can not completely describe the overall contour features of the room. It is still necessary to further expand the initial working area expanded in the step S3 along the coordinate axis direction of priority expansion.

In the steps of the embodiment, the expanded initial working area continues to be expanded in the coordinate axis direction of priority expansion selected in the step S3. Specifically, the pending boundary line perpendicular to the coordinate axis direction of priority expansion in the expanded initial working area is first deleted, the pending boundary line used in the latest expansion is also deleted, then the initial working area undergoing one expansion is re-expanded along the same coordinate axis direction of priority expansion, so that the initial working area being expanded again is a new rectangular working area framed by the remaining pending boundary lines of the working area in which the pending boundary line has been deleted before this expansion and the pending boundary line closest to the pending boundary line which is currently deleted, and then returns to the step S4. Repeating the above steps in this way, until in the current working area expansion, the increment of the diagonal length of the rectangular working area after expanding and the diagonal length of the rectangular working area before expanding is less than the preset overlap size error value, the expansion work in the coordinate axis direction with the highest expansion priority currently selected in the step S3 is stopped, at this time, a reasonable room working area is just expanded and framed, but it is not necessary to ensure that all the contour boundary positions of the closed area formed on the indoor ground are walls, thus saving robot map computing resources.

Preferably, in a previous working area expansion, when the increment of the diagonal length of the rectangular working area after expanding and the diagonal length of the rectangular working area before expanding is less than the preset overlap size error value, returning to the step S3 to select the coordinate axis direction of a lower expansion priority according to the preset expansion priority condition to continue to expand the area. This embodiment realizes that the initial working area is expanded into a working area with wider coverage, so that the robot can navigate to the target position on the wall boundary along the continuously revised and expanded pending boundary lines, and further improves the navigation efficiency of the robot along the wall boundary.

It should be noted that when the pending boundary line for framing the rectangular working area (the initial working area after one expansion or multiple expansions) is close to the associated corner area dispersed in the room or close to the wall boundary of the room, the diagonal length increment of the rectangular working area before expanding and after expanding decreases, when the increment of diagonal length before expanding and after expanding reaches the preset overlap size error value as described above, the pending boundary line perpendicular to the coordinate axis direction of priority expansion has reached the isolated corner area of the room or is further close to the wall boundary of the room. The pending boundary lines of the local area which are located and marked in the coordinate axis direction of priority expansion has a relatively dense distribution, which can almost overlap, at this time, the working area of the room with a reasonable size is just expanded and framed. As can be seen from the above embodiments, the pending boundary line perpendicular to the expansion direction has reached the boundary connecting a plurality of isolated corner areas of the room. And the pending boundary lines positioned at this area are dense and close to the wall boundary of the room, although not yet reached the wall boundary of the room, the whole working area in the room is just framed at this time, and these isolated corner areas are ignored without affecting the robot to walk along the edge or seek base for charging along the edge in the room.

Compared with the prior art, in the above embodiments, the pending boundary lines are positioned in advance using image pixel point information of the map obtained by laser scanning, according to the increment of the diagonal length of the rectangular working area framed by the pending boundary lines in the current expansion process, to determine a next expansion of the rectangular working area, when the increment of diagonal length before expanding and after expanding reaches an overlap threshold condition (the increment of the diagonal length reaches the preset overlap error value as described above), expanding the rectangular working area of the robot is stopped, the expansion is stopped to frame the indoor working area with a reasonable size, which avoids dividing a large connected area into a plurality of small areas in the process of dividing room areas, thus reducing the working efficiency of robots in indoor working areas. It is possible to save the operation resources of the robot framing the working area, avoid using software resources to process the framing and separating of the corner areas of these isolated rooms, and there is no need to ensure that the contour boundary positions of the framed working area on the indoor ground are all walls, thereby improving the efficiency of the robot navigation along the edge.

As can be seen by comparing FIG. 1 and FIG. 2, since the initial working area #1 of FIG. 1 has a largest number of the white pixel points in the line segment corresponding to the pending boundary line L1, the expansion priority configured for the pending boundary line L1 is higher, and the coordinate axis direction, i.e., the Y-axis positive direction, that is perpendicularly matched with the pending boundary line L1 is preferentially selected as the coordinate axis direction of priority expansion with the highest extension priority, causing the pending boundary line L1 to be deleted first, so the pending boundary line L1 closest below the preset position P of FIG. 1 does not appear in the laser map of FIG. 2. The initial working area #1 is then expanded along the Y-axis positive direction perpendicular to the pending boundary line L1 of the initial working area #1, the pending boundary line L2 positioned in the step S1 and adjacent to the pending boundary line L1 which is deleted is searched in the Y-axis positive direction, as shown in FIG. 2, in the step S3, the pending boundary line L2 intersects with the pending boundary lines M1, M2 and L0 of the rectangular working area #1 from which the pending boundary line L1 has been deleted, to frame an initial working area #2 after expanding, in fact, the initial working area #1 of the step S2 is covered by the initial working area #2 after expanding, and the pending boundary line which is deleted does not represent the wall. Meanwhile, as can be seen from FIG. 2, a first included angle is formed between a diagonal of the rectangular working area #1 and a diagonal of the rectangular working area #2, and a projection line segment of the diagonal of the rectangular working area #1 in the X-axis direction and a projection line segment of the diagonal of the rectangular working area #2 in the X-axis direction overlap, it can be calculated according to a triangular geometric function relationship that the diagonal length of the rectangular working area #2 is obviously larger than that of the rectangular working area #1, so that there is a certain increment between the two diagonal lengths, and the increment is larger than the preset overlap size error value, thus the rectangular working area #2 still needs to be continuously expanded in the Y-axis positive direction. The preset overlap size error value is set to 0.5 cm in both the present embodiment and the following embodiments.

Figure 3:
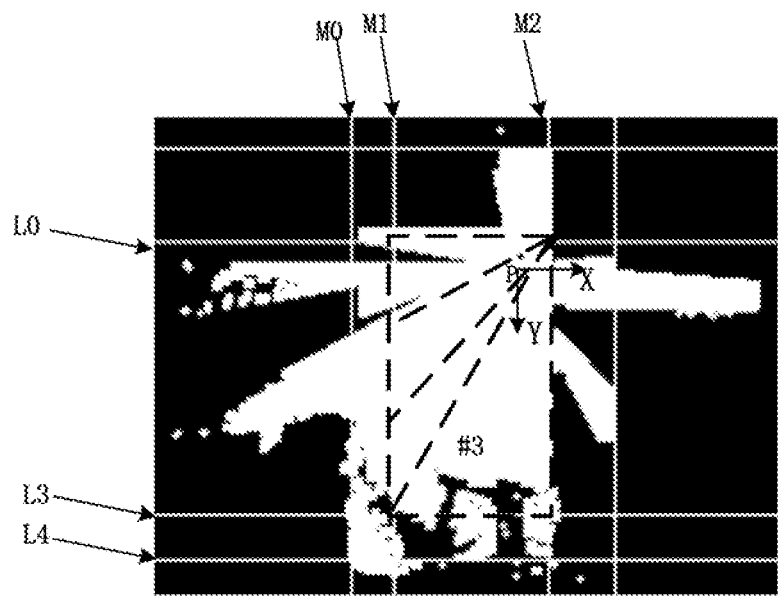
FIG. 3 is an effect diagram of deleting a pending boundary line L2 and framing a rectangular working area #3 on the laser map of FIG. 2.

As can be seen by comparing FIG. 2 and FIG. 3, since the rectangular working area #2 framed by the initial working area after expanding in FIG. 2 has a relatively large number of the white pixel points in the line segment corresponding to the pending boundary line L2, the expansion priority configured for the pending boundary line L2 is relatively high, so that the coordinate axis direction, i.e., the Y-axis positive direction, that is perpendicularly matched with the pending boundary line L2 is preferentially selected as a current coordinate axis direction of priority expansion before a new expansion is started for the rectangular working area #2, and the pending boundary line L2 is deleted first, so the pending boundary line L2 closest to the preset position P in the Y-axis positive direction in FIG. 2 does not appear in the laser map of FIG. 3, and the initial working area after expanding in this embodiment can be regarded as the rectangular working area #2 formed by the initial working area after a first expansion; and the rectangular working area #2 is then expanded along the Y-axis positive direction perpendicular to the pending boundary line L2 of the rectangular working area #2, the pending boundary line L3 positioned in the step S1 and closest to the pending boundary line L2 which is deleted is searched in the Y-axis positive direction, as shown in FIG. 3, in the step S5, the pending boundary line L3 intersects with the pending boundary lines M1, M2 and L0 of the rectangular working area #2 from which the pending boundary line L2 has been deleted, to frame a rectangular working area #3 formed by the initial working area after a second expansion, in fact, the rectangular working area #2 is covered by the rectangular working area #3, and the pending boundary line which is deleted does not represent the wall. Meanwhile, as can be seen from FIG. 3, a second included angle is formed between a diagonal of the rectangular working area #3 and the diagonal of the rectangular working area #2, and a projection line segment of the diagonal of the rectangular working area #3 in the X-axis direction and a projection line segment of the diagonal of the rectangular working area #2 in the X-axis direction overlap, and the second included angle is smaller than the first included angle, such that a degree of deviation from the diagonal of rectangular working area #3 to the diagonal of rectangular working area #2 is smaller than a degree of deviation from the diagonal of rectangular working area #2 to the diagonal of the rectangular working area #1. It can be calculated from the trigonometric geometry function relationship that an increment of the diagonal length of the rectangular working area #3 and the diagonal length of the rectangular working area #2 is smaller than an increment of the diagonal length of the rectangular working area #2 and the diagonal length of the rectangular working area #1, but the increment of the diagonal length of the rectangular working area #3 and the diagonal length of the rectangular working area #2 is still greater than the preset overlap size error value, the pending boundary line L3 has not yet reached the room corner or wall boundary area, and the rectangular working area #3 has not yet reached the overall area of the framed room, so the rectangular working area #3 still needs to be continuously expanded in the Y-axis positive direction.

Figure 4:
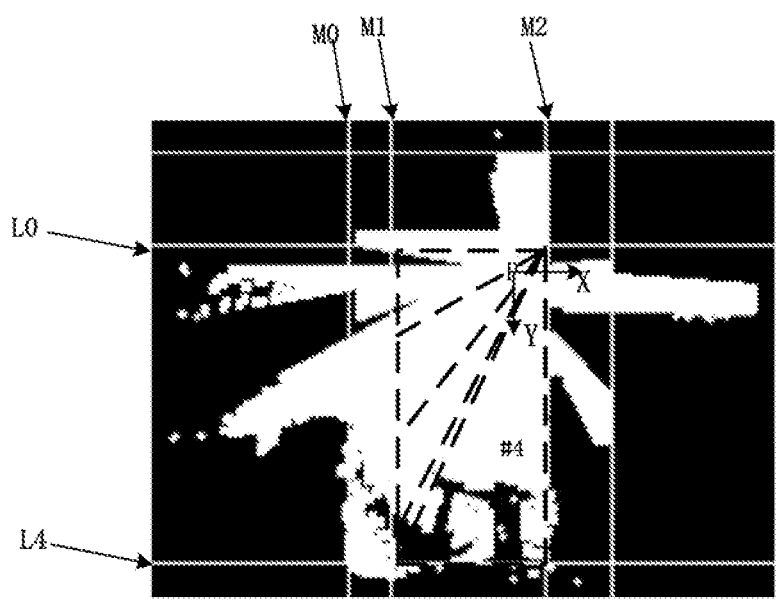
FIG. 4 is an effect diagram of deleting a pending boundary line L3 and framing a rectangular working area #4 on the laser map of FIG. 3.

As can be seen by comparing FIG. 3 and FIG. 4, since the rectangular working area #3 in FIG. 3 has a large number of the white pixel points in the line segment corresponding to the pending boundary line L3, the expansion priority configured for the pending boundary line L3 is higher, so that the Y-axis positive direction, that is perpendicularly matched with the pending boundary line L3 is preferentially selected as a current coordinate axis direction of priority expansion before a new expansion is started for the rectangular working area #3, and the pending boundary line L3 is deleted first, so the pending boundary line L3 closest to the preset position P in the Y-axis positive direction in FIG. 3 does not appear in the laser map of FIG. 4. Then continuing to expand the rectangular working area #3 along the Y-axis positive direction, meanwhile, the pending boundary line L4 positioned in the step S1 and closest to the pending boundary line L3 which is deleted is searched in the Y-axis positive direction, as shown in FIG. 4, in the step S5, the pending boundary line L4 intersects with the pending boundary lines M1, M2 and L0 of the rectangular working area #3 from which the pending boundary line L3 has been deleted, to frame a rectangular working area #4, that is, the initial working area after a third expansion, and the pending boundary line which is deleted does not represent the wall. Meanwhile, as can be seen from FIG. 4, a third included angle is formed between a diagonal of the rectangular working area #3 and the diagonal of the rectangular working area #4, and a projection line segment diagonal of the rectangular working area #3 in the X-axis direction and a projection line segment of the diagonal of the rectangular working area #4 in the X-axis direction overlap, and the third included angle is smaller than the second included angle, such that a degree of deviation from the diagonal of rectangular working area #4 to the diagonal of rectangular working area #3 is smaller than a degree of deviation from the diagonal of rectangular working area #3 to the diagonal of the rectangular working area #2. It can be calculated from the trigonometric geometry function relationship that an increment of the diagonal length of the rectangular working area #4 and the diagonal length of the rectangular working area #3 is smaller than the preset overlap size error value, the diagonal of the rectangular working area #4 and the diagonal of the rectangular working area #3 overlap within an error tolerance, indicating that the distribution of the pending boundary line L3 and the pending boundary line L4 is relatively dense, and can even be considered as overlapping together, but has not yet reached the wall boundary of the room, at this time, the working area with a reasonable size in the room is just framed and divided by the expansion, and the areas that are connected or isolated in the direction of the same pending boundary line can be ignored without affecting the robot to walk along the edge or seek base for charging along the edge according to the rectangular working area which is framed in the room.

Figure 5:
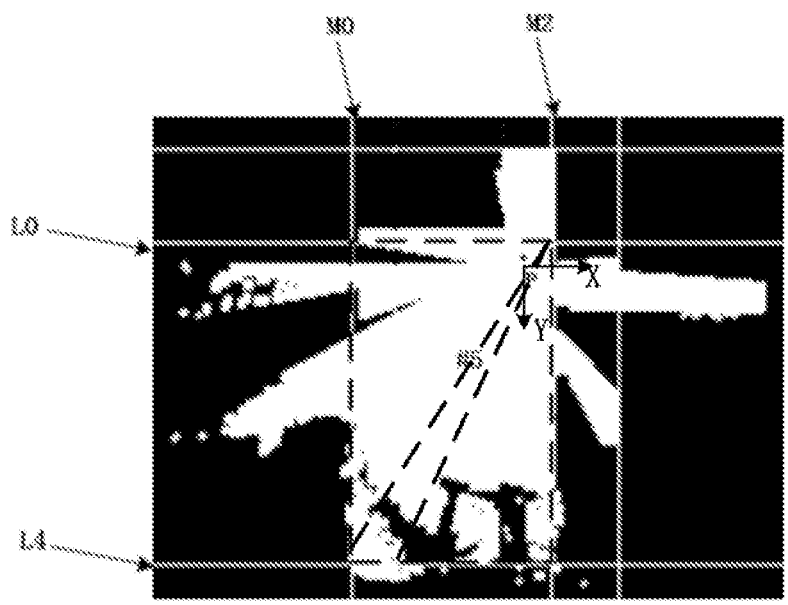
FIG. 5 is an effect diagram of deleting a pending boundary line M1 and framing a rectangular working area #5 on the laser map of FIG. 4.

As can be seen by comparing FIG. 4 and FIG. 5, since the rectangular working area #4 in FIG. 4 has a large number of the white pixel points in the line segment corresponding to the pending boundary line M1, the expansion priority configured for the pending boundary line M1 is relatively higher, so that the coordinate axis direction, i.e., the X-axis negative direction, that is perpendicularly matched with the pending boundary line M1 is preferentially selected as a current coordinate axis direction of priority expansion before a new expansion is started for the rectangular working area #4, and the pending boundary line M1 is deleted first, so the pending boundary line M1 closest to the preset position P in the X-axis negative direction in FIG. 4 does not appear in the laser map of FIG. 5. Then expanding the rectangular working area #4 along the X-axis negative direction, meanwhile, the pending boundary line M0 positioned in the step S1 and closest to the pending boundary line M1 which is deleted is searched in the X-axis negative direction, as shown in FIG. 5, in the step S3, the pending boundary line M0 intersects with the pending boundary lines L4, M2 and L0 of the rectangular working area #4 from which the pending boundary line M1 has been deleted, to frame a rectangular working area #5, that is, the initial working area after a fourth expansion, and the pending boundary line which is deleted does not represent the wall. Meanwhile, as can be seen from FIG. 5, a fourth included angle is formed between a diagonal of the rectangular working area #5 and the diagonal of the rectangular working area #4, the fourth included angle is close to the third inclined angle, and both the third included angle and fourth included angle are small, and a projection line segment of the diagonal of the rectangular working area #5 in the Y-axis direction and a projection line segment of the diagonal of the rectangular working area #4 in the Y-axis direction overlap. It can be calculated from the trigonometric geometry function relationship that an increment of the diagonal length of the rectangular working area #5 and the diagonal length of the rectangular working area #4 is smaller than the preset overlap size error value, the diagonal of the rectangular working area #5 and the diagonal of the rectangular working area #4 overlap within the error tolerance, indicating that the distribution of the pending boundary line M0 and the pending boundary line M1 is relatively dense, and can even be considered as overlapping together, just closes to the wall boundary of the room, at this time, the working area with a reasonable size in the room is just framed and divided by the expansion, and the discretely distributed room corner areas connecting with pending boundary line M0 can be ignored without affecting the robot to walk along the edge or seek base for charging along the edge according to the framed rectangular working area in the room, at this time, the expanding in the X-axis negative direction selected in the aforementioned example stops.

It should be noted that in the process of expanding from the initial working area #1 of FIG. 1 to the rectangular working area #5 of FIG. 5, according to the preset expansion priority condition, one coordinate axis direction of priority expansion is selected, each time when the initial working area is expanded in this coordinate axis direction, only one pending boundary line in the rectangular working area framed before expanding perpendicular to the coordinate axis direction is deleted. An expansion stop condition is controlled in combination with a change amount of the diagonal length of the rectangular working area before expanding and after expanding. In the embodiment of FIGS. 1 to 5, the map area except the middle white area and the discretely distributed white areas is composed of the pixel points with the other grayscale values. Although the brightness of the schematic diagram of the map image is close to black, it is actually composed of the pixel points with the grayscale values from 1 to 254, and only the contour boundary of the room is composed of black pixel points, and the contour boundary of the room and the pending boundary lines can be obtained by comparing the black-and-white map of FIG. 7.

Preferably, during a first execution of the step S3, when each of the pending boundary lines of the initial working area which is framed is not a non-wall boundary line segment, and a length of an isolated obstacle line segment in the initial working area is less than a relatively small value, the initial working area is determined a closed area, the relatively small value is the smaller of a preset ratio of a line segment length corresponding to the number of pixel points of a third predetermined number and a length of any side of the initial working area; and when one of the pending boundary lines of the initial working area which is framed is the non-wall boundary line segment, or the length of the isolated obstacle line segment in the initial working area is greater than or equal to the line segment length corresponding to the number of the pixel points of a third predetermined number, or the length of the isolated obstacle line segment in the initial working area is greater than or equal to a preset ratio of a length of one side of the initial working area, the initial working area is determined not a closed area. It should be noted that the pending boundary lines are divided into non-wall boundary line segments and wall boundary line segments according to the number of the white pixel points, and the number of the white pixel points in the non-wall boundary line segment is greater than or equal to a certain threshold value, while the wall boundary line segment is less than the certain threshold value, and the threshold value is greater than the preset boundary threshold value. Isolated obstacle line segments which are scanned also exist in the laser map, when the length of the isolated obstacle line segment is greater than or equal to one of the preset ratio of the length of one side of the initial working area and the length of the line segment corresponding to the number of the pixel points of a third predetermined number, the isolated obstacle line segment is determined as a wall in the initial working area, and thus is marked as the wall boundary line segment to cooperate with other of the pending boundary lines to frame a new rectangular working area, and this new rectangular working area can have an overlapping area with the initial working area or the initial working area which is expanded. In this embodiment, the environmental characteristics of the closed area are determined through the nature of the obstacle boundary line segment surrounding the current working area and the length of the isolated obstacle line segment in the current working area, and judging whether the line segments forming the closed area are walls can eliminate interference of straight lines of obstacles in other areas and isolated obstacles inside; and judging whether the length of the isolated obstacle line segment in the current working area is less than the length of the line segment corresponding to the number of the pixel points of the third predetermined number and less than the preset ratio of the length of any side of the current working area can avoid misjudging the interference effect of the wall and improves the accuracy of the judgment of the closed area, when the current working area is the initial working area, the length of the line segment corresponding to the number of the pixel points of the third predetermined number is preferred to be 50 cm, and the preset ratio is $\frac{1}{3}$.

A chip has a control program inside, and the control program is configured to control a mobile robot to execute the method for expanding the working area. It is to be understood that the embodiments described herein can be implemented in hardware, software, firmware, middleware, microcode or any combination thereof. For hardware implementations, the processing unit can be implemented within one or more application specific integrated circuits (ASIC), digital signal processors (DSP), digital signal processing devices (DSPD), programmable logic devices (PLD), field programmable gate arrays (FPGA), processors, controllers, microcontrollers, microprocessors, other electronic units designed to perform the functions described herein, or combinations thereof. When embodiments are implemented in software, firmware, middleware or microcode, program code or code snippets, they can be stored in a machine-readable medium such as a storage component.

A robot is equipped with a laser sensor, and the robot is provided with the chip therein for processing laser data scanned by the laser sensor in real time to construct a laser map.

Logic and/or steps expressed in the flowchart or otherwise described herein, for example, it can be considered as an ordered listing of executable instructions for implementing logical functions, can be embodied in any computer-readable medium for use by with, or in connection with an instruction execution system, apparatus, or device, such as a computer-based system, processor-containing system, or other systems that can fetch the instructions from the instruction execution system, apparatus, or device and execute the instructions. Given this description, "a computer-readable medium" can be any device that can contain, store, communicate, propagate, or transmit programs for use with or in connection with an instruction execution system, apparatus, or device. More specific examples (a non-exhaustive list) of the computer-readable medium include the following: an electrical connector (an electronic device) having one or more wiring, a portable computer diskette (a magnetic device), a random access memory (RAM), a read-only memory (ROM), an erasable programmable read-only memory (EPROM or Flash memory), an optical fiber, and a portable compact disc read-only memory (CD-ROM). In addition, the computer-readable medium could even be paper or other suitable media upon which the program can be printed, as the program can be captured electronically via, for instance, optical scanning of paper or other media, then compiled, interpreted or processed in a suitable manner, if necessary, and then stored in a computer memory.

The above-mentioned embodiments are only intended to explain the technical concept and features of the present disclosure, and its purpose is to enable those skilled familiar with the technical field to understand the contents of the present disclosure and implement it accordingly, and cannot limit the protection scope of the present disclosure. Any equivalent transformation or modification made in accordance with the spirit of the present disclosure shall be covered within the scope of protection of the present disclosure.

What is claimed is:

1. A robot equipped with a laser sensor, wherein the robot is provided with a chip for processing laser data scanned by the laser sensor in real time to construct a laser map, the chip with a control program inside, wherein the control program is configured to control a mobile robot to execute a method for expanding a working area based on the laser map, wherein the method for expanding the working area comprises:

step 1, setting pending boundary lines along coordinate axis directions of the laser map constructed in real time, so that an area extending along each of the coordinate axis directions is divided by the pending boundary line set correspondingly;

step 2, when a robot moves to a preset position of an indoor working area, selecting one pending boundary line closest to the preset position in each of the coordinate axis directions, and framing an initial working area which is rectangular;

step 3, selecting one coordinate axis direction of priority expansion according to a preset expansion priority condition, deleting one pending boundary line set perpendicular to the coordinate axis direction correspondingly in the initial working area, then starting to expand the initial working area along the coordinate axis direction which is same, so that an initial working area after expanding is a new rectangular working area formed by a remaining pending boundary line framing the initial working area and one pending boundary line closest to the pending boundary line which is deleted; and step 4, judging whether an increment of a diagonal length of the initial working area after expanding and a diagonal length of the initial working area before expanding is less than a preset overlap size error value, in a case that the increment of the diagonal length of the initial working area after expanding and the diagonal length of the initial working area before expanding is less than the preset overlap size error value, stopping expanding.

2. The method for expanding the working area according to claim 1, wherein the method further comprises stopping expanding in the coordinate axis direction currently selected in the step 3 when the increment of the diagonal length of the initial working area after expanding and the diagonal length of the initial working area before expanding is less than the preset overlap size error value, and returning to the step 3 to select one coordinate axis direction with a lower expansion priority.

3. The method for expanding the working area according to claim 2, wherein the method further comprises deleting one pending boundary line in the initial working area after expanding perpendicular to the pending boundary line selected in the step 3 when judging that the increment of the diagonal length of the initial working area after expanding and the diagonal length of the initial working area before expanding is greater than or equal to the preset overlap size error value, and then continuously expanding the initial working area after expanding along the coordinate axis direction which is same, so that the initial working area is re-expanded from a location of the pending boundary line which is currently deleted to one pending boundary line closest to the pending boundary line which is currently deleted, and then returning to the step 4.

4. The method for expanding the working area according to claim 3, wherein a method for positioning and marking the pending boundary line comprises:

whenever the number of black pixel points with a same ordinate value counted along an X-axis direction exceeds a preset boundary threshold value, marking the pending boundary line formed by a connection of the black pixel points with the same ordinate value, so that an area extending along the X-axis direction is divided by the pending boundary line correspondingly; and whenever the number of the black pixel points with a same abscissa value counted along a Y-axis direction exceeds a preset boundary threshold value, marking the pending boundary line formed by a connection of the black pixel points with the same abscissa value, so that an area extending along the Y-axis direction is divided by the pending boundary line correspondingly.

5. The method for expanding the working area according to claim 4, wherein the diagonal length of the initial working area after expanding and the diagonal length of the initial working area before expanding are both obtained by computing a square sum of a length of a line segment corresponding to one pending boundary line set perpendicular to the X-axis direction and a length of a line segment corresponding to one pending boundary line set perpendicular to the Y-axis direction of the rectangular working area which is framed according to Pythagorean theorem.

6. The method for expanding the working area according to claim 4, wherein selecting the coordinate axis direction of priority expansion according to the preset expansion priority condition, comprises:

comparing the number of white pixel points arranged on a line segment corresponding to each of the pending boundary lines of the initial working area which is framed, wherein the larger the number of the white pixel points is, the higher the expansion priority condition configured for the pending boundary line is, and one coordinate axis direction that is perpendicularly matched with the pending boundary line is preferentially selected as the coordinate axis direction of priority extension.

7. The method for expanding the working area according to claim 6, wherein when each of the pending boundary lines of the initial working area which is framed is not a non-wall boundary line segment, and a length of an isolated obstacle line segment in the initial working area is less than a relatively small value, determining that the initial working area is a closed area, the relatively small value is the smaller of a preset ratio of a line segment length corresponding to the number of pixel points of a third predetermined number and a length of any side of the initial working area; and when one of the pending boundary lines of the initial working area which is framed is the non-wall boundary line segment, or the length of the isolated obstacle line segment in the initial working area is greater than or equal to the line segment length corresponding to the number of the pixel points of the third predetermined number, or the length of the isolated obstacle line segment in the initial working area is greater than or equal to a preset ratio of a length of one side of the initial working area, determining that the initial working area is not the closed area, wherein the pending boundary lines are divided into non-wall boundary line segments and wall boundary line segments according to the number of the white pixel points, the number of the white pixel points in the non-wall boundary line segment is greater than or equal to a certain threshold value, while the wall boundary line segment is less than the certain threshold value, and the threshold value is greater than the preset boundary threshold value; and wherein isolated obstacle line segments which are scanned also exist in the laser map, when the length of the isolated obstacle line segment is greater than or equal to one of the preset ratio of the length of one side of the initial working area and the length of the line segment corresponding to the number of the pixel points of the third predetermined number, the isolated obstacle line segment is determined as a wall in the initial working area, and thus is marked as the wall boundary line segment to cooperate with other of the ending boundary lines to frame a new rectangular working area.

* * * * *